Figure 1:
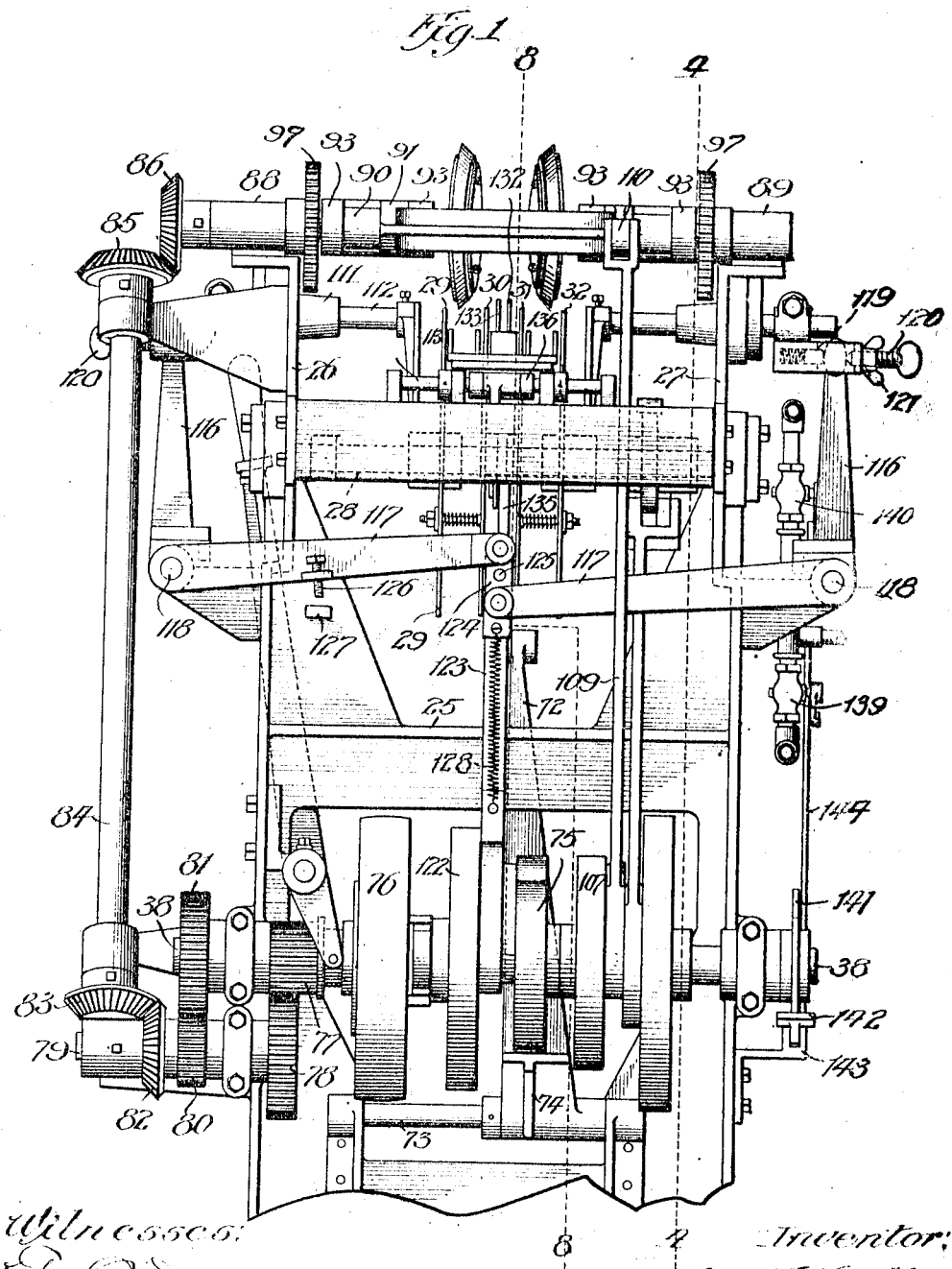

E. E. KIMBLE.
VIAL BOTTOMING MACHINE.
APPLICATION FILED JAN. 7, 1911.

1,055,402.

Patented Mar. 11, 1913.
7 SHEETS—SHEET 3.

Witnesses:

Inventor:
Evan E. Kimble
By Linthicum, Kelt & Fuller
Attys.

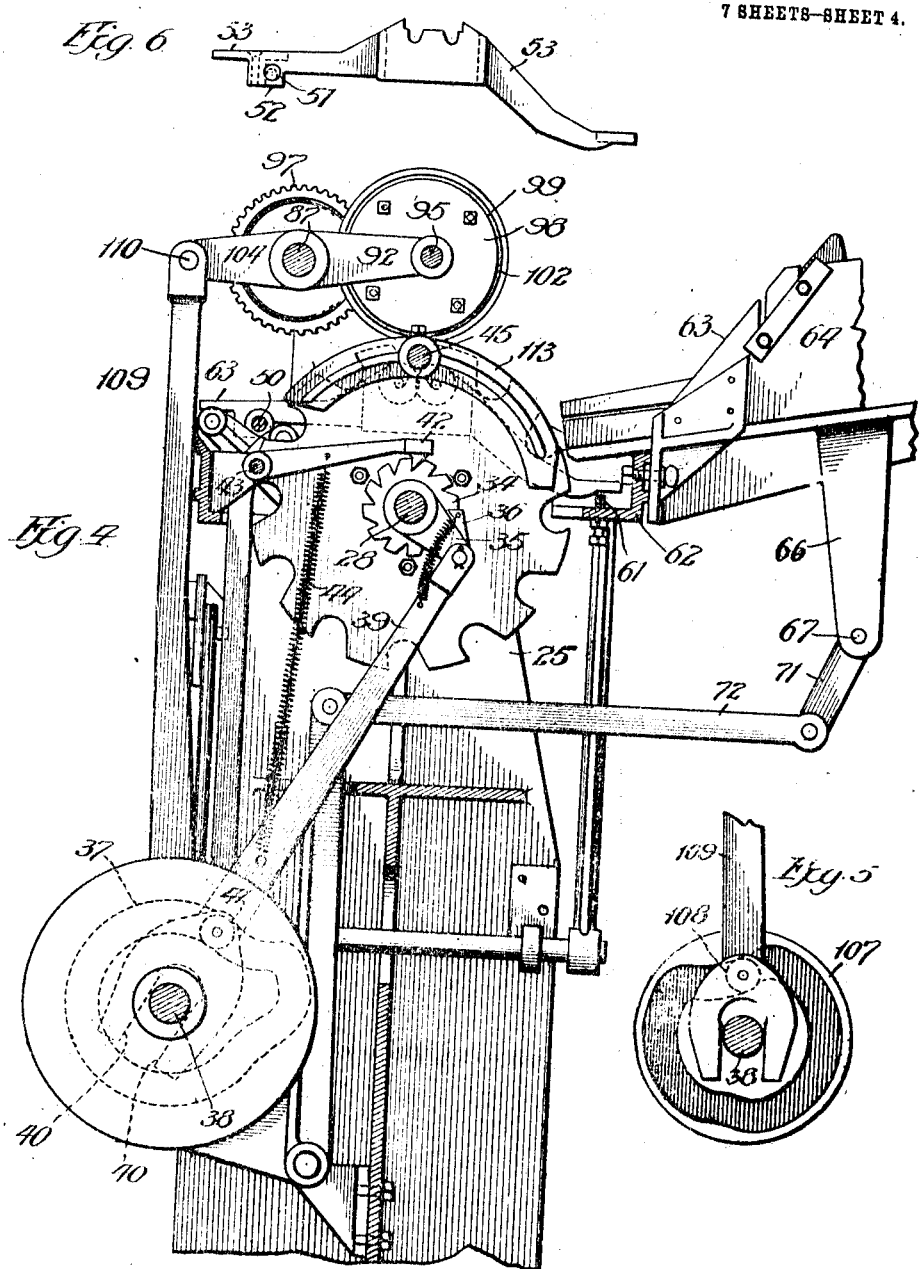

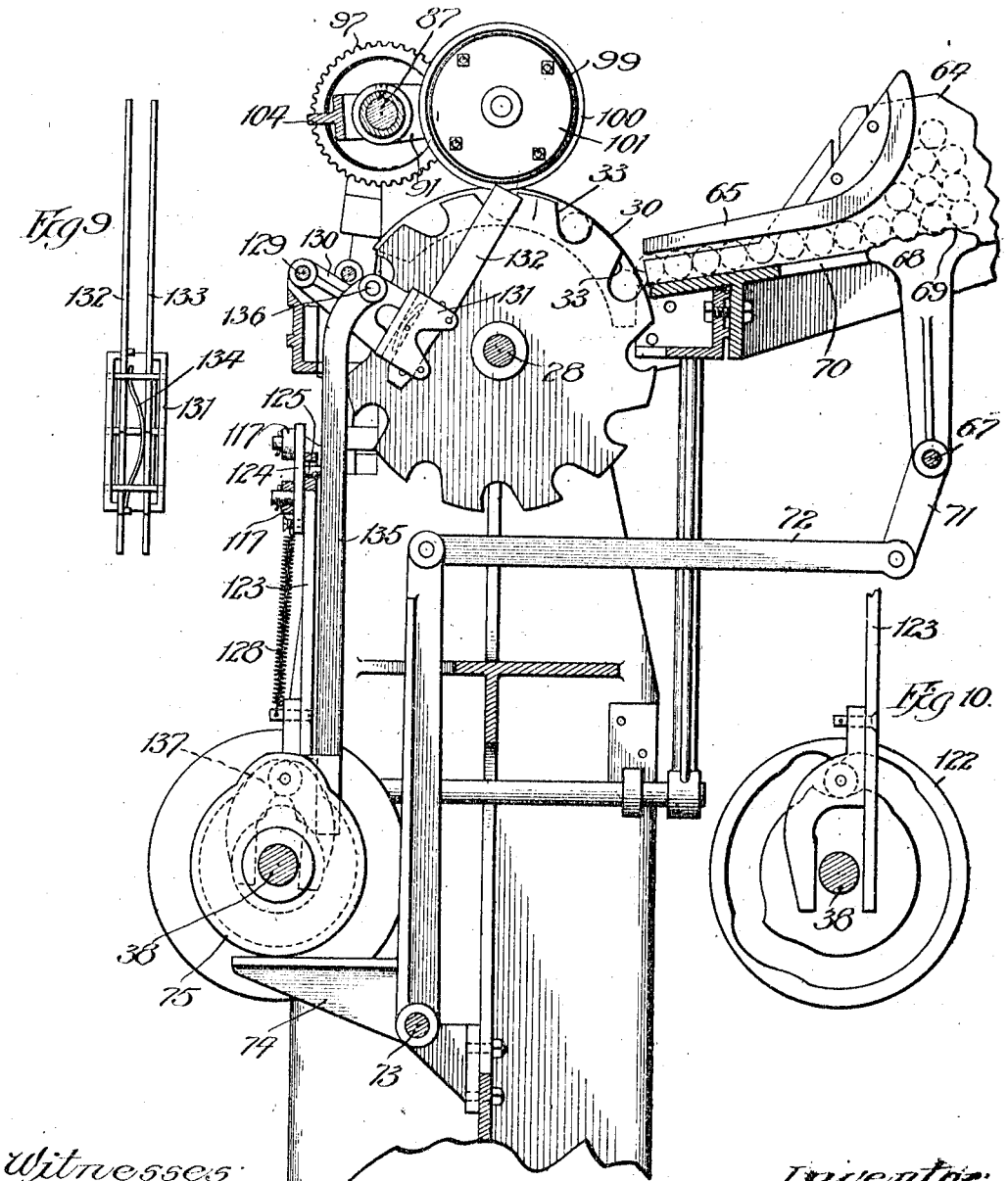

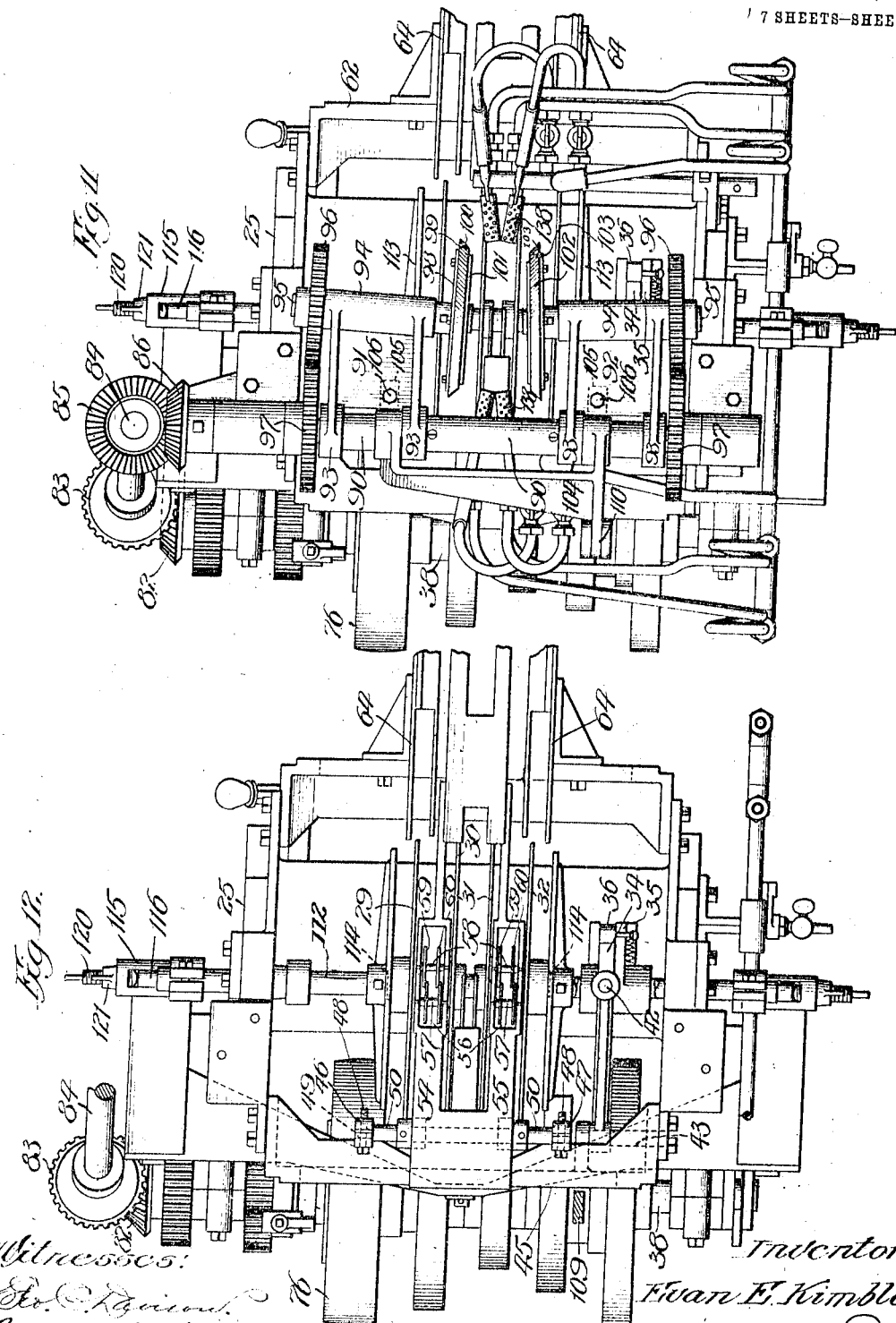

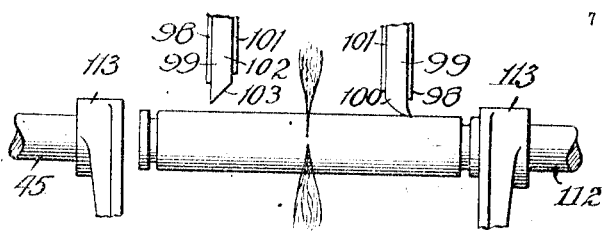
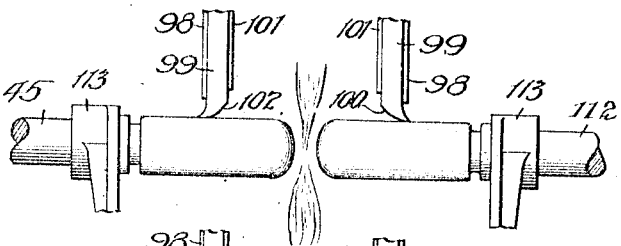
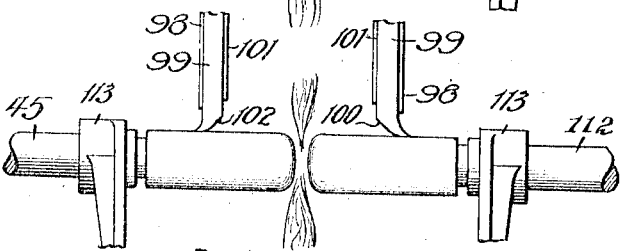
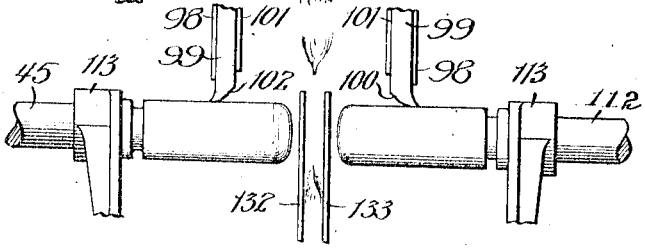
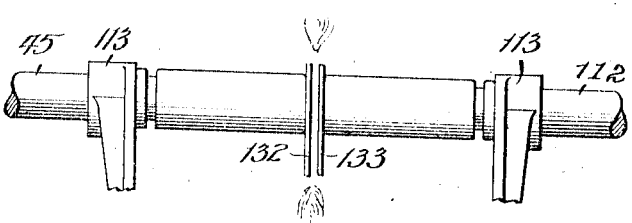
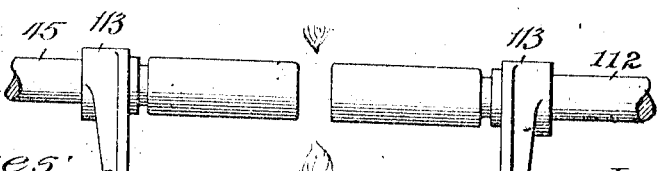

UNITED STATES PATENT OFFICE.

EVAN E. KIMBLE, OF CHICAGO, ILLINOIS, ASSIGNOR TO KIMBLE GLASS COMPANY, OF CHICAGO, ILLINOIS, A CORPORATION OF ILLINOIS.

VIAL-BOTTOMING MACHINE.

1,055,402.  Specification of Letters Patent.  Patented Mar. 11, 1913.

Application filed January 7, 1911. Serial No. 601,330.

*To all whom it may concern:*

Be it known that I, EVAN E. KIMBLE, a citizen of the United States, residing at Chicago, in the county of Cook and State of Illinois, have invented certain new and useful Improvements in Vial-Bottoming Machines, of which the following is a specification.

My invention pertains to appliances or machines for automatically forming and finishing the bottoms of glass vials or bottles, and more specifically relates to mechanisms for dividing double tubular blanks into a pair of blanks and finishing or truing the bottom of each.

In the accompanying drawings which form a part of this specification and throughout the various views of which like reference characters refer to the same parts, I have illustrated a preferred and desirable embodiment of this invention.

Figure 2:
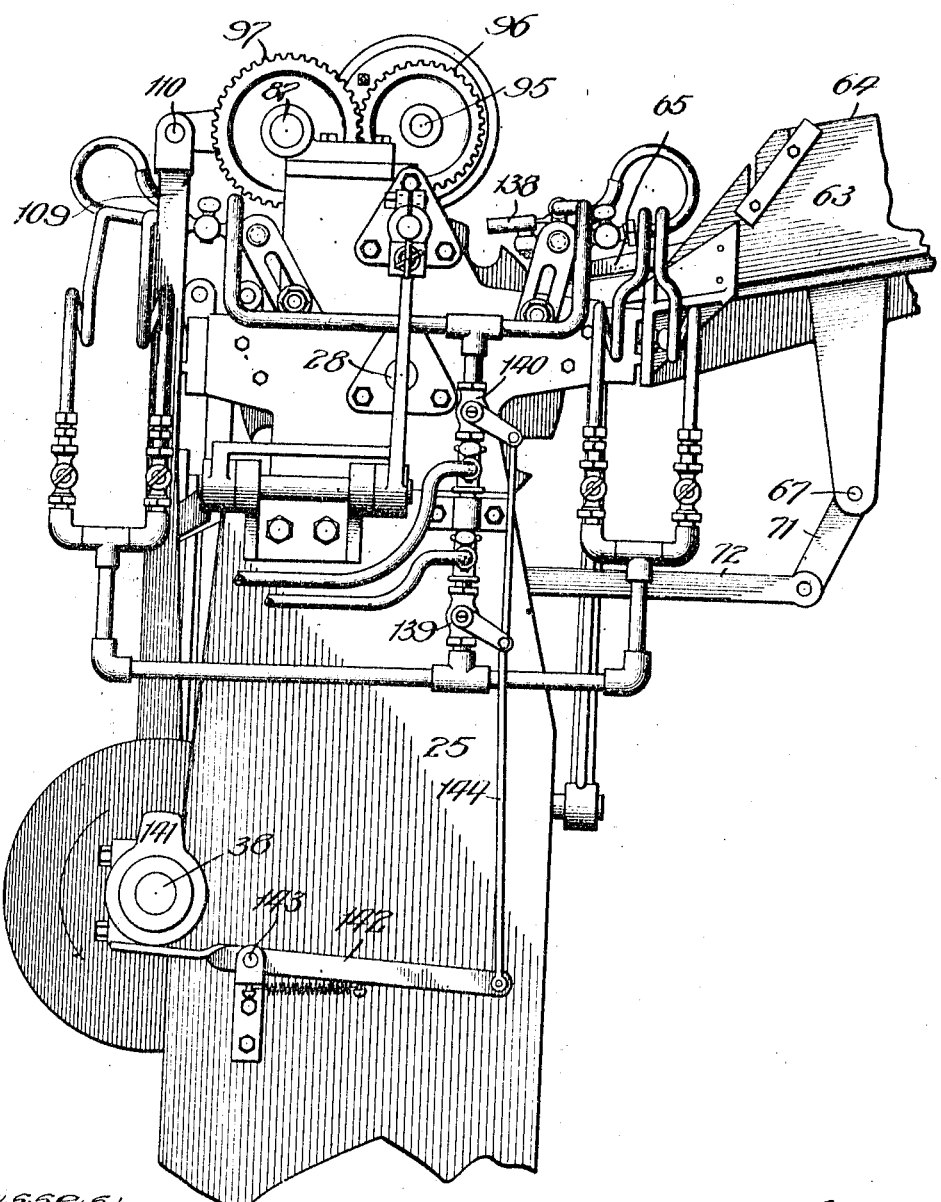
Figure 3:
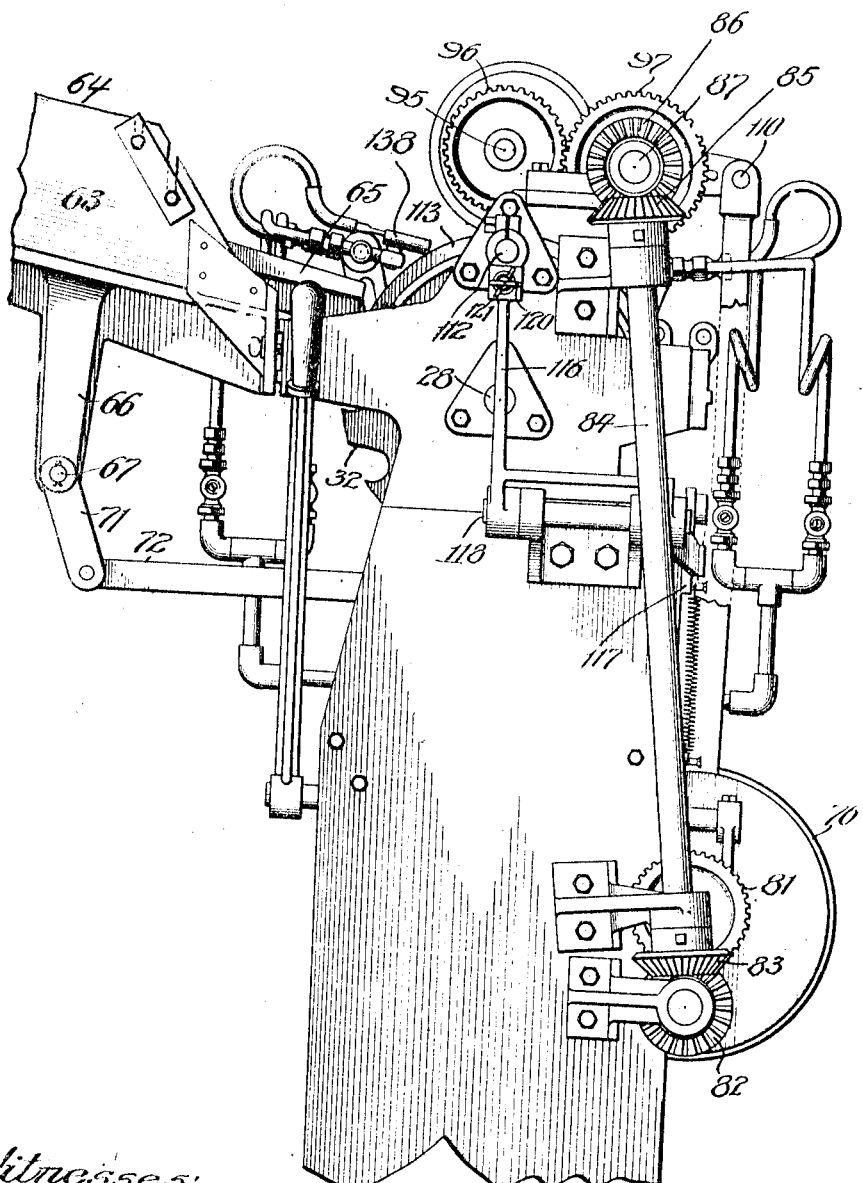

In these drawings: Figure 1 is a rear elevation of the machine; Fig. 2 is an elevation of the left hand end of the machine as viewed from the front; Fig. 3 is an elevation of the other end of the machine; Fig. 4 is a vertical cross-section on line 4—4 of Fig. 1; Fig. 5 is a cross-section through the cam shaft showing one of the cams; Fig. 6 is a side elevation of the roller supporting frame; Fig. 7 is a plan view of the same part; Fig. 8 is a vertical cross-section on line 8—8 of Fig. 1; Fig. 9 is a detail view of the bottom finisher; Fig. 10 is another section through the cam shaft; Fig. 11 is a plan view of the machine; Fig. 12 is a similar view with the top portions of the machine removed; and Figs. 13 to 18 are diagrammatic views illustrating the various steps in dividing the double tubular blanks and finishing the bottoms of the two separated blanks.

The machine comprises a main frame or support 25, having a pair of members 26 and 27, in which is a conveyer shaft 28, intermittently rotatable and having fixed to its central portion four conveyer disks 29, 30, 31 and 32, notched at 33 at intervals and in alinement for the accommodation and transportation of the tubular glass double blanks. This conveyer shaft 28 has fixed thereto a ratchet wheel 34, and at the side of such a wheel a pawl arm 35 is loosely mounted on the shaft, said arm carrying at its outer end a spring-actuated pawl 36, adapted to co-act with the teeth of the ratchet wheel. This arm is operated at intervals by means of a cam 37, fixed to a revoluble lower cam shaft 38, the pawl arm 35 receiving its movement from the cam by means of a connecting member 39 pivoted to the end of arm 35, and having its lower end bifurcated at 40 so as to straddle the cam shaft 38, such member 39 carrying a roller 41 traveling in the irregular groove of the cam. By this means the intermittent rotation of the conveyer shaft and conveyer disks is brought about, backward travel of these parts being prevented by a lock pawl 42, fulcrumed on the arm of the machine at 43 and pulled down by a coil contractile spring 44 which connects the same with the lower portion of connection member 39.

On a cross bar 45, (Fig. 12) of the main frame 25 there is mounted a pair of split clamps 46 and 47 tightened by means of screws 48 and accommodating a rod 49 having a central eccentric portion 50 extended through apertures 51 in depending ears 52, extending downwardly through opposite sides of a roller frame 53, (Figs. 4, 6 and 12). This arm has two forwardly-extending portions 54 and 55 accommodated between the two inner and outer conveyer disks 30 and 31 and 29 and 32. These portions of the frame are open at 56 which accommodate two short shafts 57 and 58, each of which is equipped with a pair of rollers 59 and 60. At their front ends these two portions 54 and 55 are connected together by a part of the frame which is supported on an adjusting screw 61 projecting upwardly through a threaded opening in the bar 62 extended across the front of the machine and supported by and forming a part of the main frame 25. These rollers are so positioned as to support the tubular blanks in the position in which they are heated, separated, and finished, one of the double blanks temporarily resting on these rollers during these operations due to the intermittent action of the notched conveying disks. It will be apparent that, by loosening the screws 48, the eccentric rod 49—50 may be turned angularly so as to adjust the roller frame 53 slightly forwardly or rearwardly to proper position, vertical adjustment of such frame being brought about by the manipulation of the adjusting screw 61.

At the front of the machine and mounted on the bar 62 I employ a feed magazine 63, adapted to receive the tubular double blanks, the opposite ends of which have preferably already been supplied with necks and mouths. This magazine has a pair of side walls 64, adjustably secured to the inner face of each of which is a curved guide 65 projecting in an inclined direction to the conveyer, the general disposition of the magazine itself being also inclined. These guides are provided for the purpose of compelling the glass tubular blanks to be fed to the conveyer in a single layer as shown in Fig. 8. In order to agitate these tubular blanks in the magazine so as to bring about a proper feed of the same to the conveyer, I provide the magazine with a pair of depending arms 66 providing bearings for an agitator shaft 67 on which is rockingly mounted an agitator 68 having a somewhat roughened top surface 69 projecting upwardly into the conveyer through a slot 70 whereby a portion of the tubular blanks rest upon the agitator. The lower end of the latter is connected by a link 71, (Fig. 8) to the upper end of a bell crank lever 72 fulcrumed on the frame at 73 in coöperative relation with a projection 74 on the edge portion of a rotary cam 75 fixed to the cam shaft 38. When this projection strikes the foot or short arm of the bell crank the agitator is swung in one direction and during the continued rotation of the projection it will subsequently strike the longer arm of the bell crank working the agitator in the opposite direction. In this way the glass blanks are sufficiently agitated or stirred to bring about the proper feed to the conveyer. As is clearly indicated in Fig. 8 the discharge mouth of the magazine is in register with one set of notches of the multiple disk conveyer when the latter is temporarily stationary so that the blanks can be readily fed automatically to the conveyer. The succeeding blanks beneath the guides being held back in position by the peripheries of the conveyer disks until another set of notches comes into register with the magazine mouth.

The cam shaft 38 referred to is rotated by means of a pulley 76 loosely mounted thereon, such pulley having fixed thereto a pinion 77 in mesh with a larger gear 78 on a short shaft 79, the latter also being equipped with a pinion 80 in mesh with a gear 81 on shaft 38 by means of which such shaft is rotated. In addition the short shaft 79 is equipped with a bevel gear 82 meshing with a similar gear 83 on the lower end of a slightly inclined shaft 84, the upper end of which, by means of co-acting bevel gears 85 and 86 rotates a top longitudinal shaft 87 revoluble in a pair of bearings 88 and 89 on the main frame.

Loosely mounted on shaft 87 is a sleeve 90 on which at its opposite ends are rockingly mounted a pair of bearing members 91 and 92, each having a pair of spaced apertured collar portions 93, in which the sleeve is fitted whereby these bearing members are free, owing to their own weight and the parts which they carry, to descend unless lifted by mechanism hereinafter referred to. The bearing member 92 has at its front portion a bearing 94 accommodating a shaft 95 equipped at one end with a gear 96 meshing with a similar gear 97 fixed to shaft 87, by means of which gearing shaft 95 is rotated. At its inner end such shaft 95 has fixed thereto a metal disk 98 secured to which is a resilient or elastic disk or ring 99, such for example as rubber, the periphery or edge 100 of which is beveled in the direction indicated. The greater portion of the end face of such rubber disk is covered with an asbestos protecting facing 101. The other bearing member 91 is likewise supplied with collar portions 93, bearing 94, shaft 95, co-acting driving gears 96 and 97, metal disk 98, protective facing 101, and rubber disk or ring 102, having an angular or beveled face 103 beveled in the opposite direction from that of disk 99 for a purpose set forth hereinafter. It should be noted also that the bearings 94 of the members 91 and 92 are not parallel to the axis of the top shaft 87, but are slightly diagonally disposed thereto in opposite directions, as is clearly shown for example in Fig. 11. Rockingly mounted on the sleeve 90 I employ a lifting member 104, having two forwardly extending fingers 105 disposed beneath the bearing members 91 and 92, the latter being equipped with an adjusting screw 106 with which the two fingers are adapted to co-act to lift the bearing members and their rollers at intervals. This rockingly lifted member 104 is operated in proper timed relation to the actuation of the other parts of the mechanism by means of a cam 107 on cam shaft 38, such cam co-acting with a roller 108 on a connecting bar 109, which at its lower end straddles the cam shaft and at its upper end is pivoted at 110 to a rearwardly extending portion of the lifting member.

In a bearing 111 on the frame of the machine I mount a sliding shaft or rod 112, having fixed to its inner end a curved head 113 adjacent to the notched conveyer disk 32, said head having therein a freely rotatable anti-friction disk 114 in register with the glass tube sections when the latter are resting upon the supporting rollers 59 and 60, the adjacent end of the tubular blank being adapted to bear against such anti-friction disk or abutment. A vertically slotted bracket 115 is clamped on the outer end of the sliding shaft or rod 112, the slot of the same accommodating the upstanding arm 116 of a bell crank lever, having a substantially-horizontal arm 117. As is clearly shown such lever is suitably fulcrumed on the frame at 118. The bracket 115 referred to has a spring-pressed block 119 bearing against the inner side of the arm 116, such bracket being also equipped with an adjusting screw 120 pressing against the outer face of such arm. To prevent loosening of the screw the latter is provided with a winged lock-nut 121. As will be readily understood, by adjusting the position of the bracket on the rod and adjusting the connection of the bell-crank lever with the bracket, the movement of the curved head may be varied so that the machine can accommodate and work upon blanks of different lengths. The sliding head 113 and its operating parts, so far as they have been described above, are duplicated on the opposite side of the machine as is clearly indicated in the drawing. (See Fig. 12.) Both of these bell-crank levers and the curved heads which they actuate are operated by means of a rotary cam 122 on cam shaft 38, such cam having a groove receiving a roller on a connecting rod 123, which straddles the shaft as shown in Fig. 10, and which has at its upper end a short equalizing lever 124, fulcrumed thereon at 125. The opposite ends of such equalizing lever having pivotal connection with the ends of the horizontal arms 117 of the two bell cranks. (See Fig. 1).

In a machine of this kind it is desirable to so make the mechanism that it will bottom vials of different capacities, that is of different lengths, consequently the machine must be so constructed as to accommodate tubular blanks of different lengths and to do this the movements of the sliding heads 113 must be varied. In the present instance this difference in the travel of the curved heads is brought about without changing the operating cam actuating the bell-crank levers 116 and 117. The cam 122 has one or more portions of the inner surface of its groove of less radius than is necessary to accommodate the roller traveling in the groove. In other words, at one or more points of the groove the roller is loose therein and in order to maintain the roller in the proper desired position during its travel through such enlarged part or parts of the groove the following instrumentalities are employed.

The downward rocking of the horizontal arm 117 of one of the bell cranks is limited and restricted by an adjustable screw 126 which bears on a stop 127 on the machine frame, which, of course, limits the inward travel of the roller toward the axis of the cam shaft. Also the pivotal connection of the equalizing lever 124 on the connecting rod 123 is a pin-in-slot connection, as shown in Fig. 8, such equalizing lever being normally pulled downwardly to the limit of travel of the pin in the slot by a coil contractile spring 128. Obviously, the adjusting of the screw 126 in effect modifies the shape of the operating cam 122.

By reference to Fig. 8 it will be observed that on a supporting rod 129 at the back of the machine I rockingly mount an arm 130 of box-like or skeleton formation at its front end 131, such end accommodating two finishing bars 132 and 133, yieldingly held apart by an interposed leaf spring 134. This arm is oscillated intermittently so as to bring the end of these finishing bars into and out of operative position with relation to the bottoms of the vials, by means of a connecting rod 135 pivoted at 136 to the arm and having its lower forked end provided with a roller 137 traveling in a groove in a side face of the rotary cam 75. In Fig. 8 these finishing blades or bars are shown in operative position with respect to the ends of the vials.

The machine has at its front and also at its rear a pair of gas burners 138 to which gas and air are supplied in the usual and customary manner through suitable pipes, the gas supply being governed and controlled by a valve 139, while the air supply is controlled by a similar valve 140, both of such valves being operated by a valve cam 141 on an end of the cam shaft 38, such cam co-acting with a spring-governed lever 142 fulcrumed on the frame of the machine at 143 and connected to the two valves by a link or connecting rod 144. This cam controls the supply of gas and air to the burners in such a manner that the front and rear flames are directed onto the central portion of the tubular blanks and on to the bottoms of the vials made therefrom during the preliminary heating of the blank and during the forming and finishing of the vial bottom, the supply of gas being reduced and the supply of air being cut off during the pressing of the bottoms against the finishing blades and during the travel of the conveyer to bring a new blank into position.

The operation of this machine is substantially as follows: The double tubular hollow glass blanks, (the term double being used because each blank forms two vials) are fed individually from the magazine into the notches or recesses of the intermittently-operating rotary conveyer. During the first step of the conveyer after one of its pockets has received one of the double blanks, the latter is brought up under and is temporarily held stationary beneath the front gas burner and in sufficient proximity thereto to be heated thereby enough to expel the moisture therefrom. During the next actuation of the conveyer such tubular blank is moved rearwardly from beneath the front burner and is deposited upon the eight supporting rollers 59 and 60. Then the valve cam 141 automatically opens the gas and air valves 139 and 140 causing the training or directing of the gas flames upon the central portion of the blank, which is rotated at this time and held against the anti-friction disk 114 of the right-hand curved head 113 (as the machine is viewed from the front) by the positively-driven yielding beveled rubber disk 99, which is permitted to come into contact with the top of the right-hand portion of the blank by the operation of cam 107 which controls the actuation of lifting member 104. At this time, however, the lifting member has not been shifted or lowered sufficiently to permit the other beveled roller 112 to engage the tube. The diagonal disposition of shaft 95 and rubber disk 99 combined with the operation of the beveled face of the latter acts to hold the blank over against the anti-friction disk so that the central portion of the blank will be heated. It is not absolutely necessary that this rubber roller 98 should have this diagonal relation since the yielding of this beveled portion is sufficient to pull the tube over to the right against the corresponding head and its anti-friction disk. After the rotating blank has been heated sufficiently in this manner the lifting member is rocked farther downwardly by this cam so as to permit the companion rubber disk 102 to engage the top of the left-hand part of the blank, the right-hand roller or disk 99 maintaining its contact with the other half of the blank. At the same time that the roller 102 engages the blank the two curved heads 113 separate somewhat due to the action of their controlling cam and the two rubber rollers 99 and 92 act to pull apart the two halves of the tubular blanks, which results in the closing of the adjacent bottoms of the two alined vials, each of which is now supported on four of the rollers 59 and 60. The controlling cam then causes the two heads 113 to approach one another, the two rubber rollers each revolving its own vial, so as to again bring the bottoms of the vials into the flames of the gas burners which act to reheat such bottoms causing an evening of the thickness thereof. This approach of the heads and vials toward one another is of course in opposition to the lesser separating action of the pair of yielding beveled rollers. The heads 113 then separate again, the two vials following them, owing to the separating action of their rubber rollers, the spring-pressed finishing blades are shifted into position between such bottoms by their operating cam, and then the heads approach each other so as to push the bottoms of the two vials against the opposite sides of the two finishing blades or bars 132 and 133 which yield and move toward one another in opposition to the expanding or separating action of the leaf spring 134. After the vials have been separated and after their bottoms have been reheated, just preliminary to the introduction of the finishing blades between them, the rubber rollers are lifted so that when the bottoms of the vials are pressed against the finishing blades they are not rotated. During the next movement of the conveyer the two alined finished vials are carried rearwardly by the two halves of the conveyer so that their bottoms are temporarily held beneath the rear burner which acts to anneal the same and permits the bottoms to become thoroughly set before the vials are discharged at the back of the machine, which action takes place during the next movement of the conveyer.

It is to be understood that four of the pockets of the conveyer are at all times occupied, so that while one blank is being operated upon to produce the vials another blank is being preliminarily heated, another blank is being introducted into the conveyer, and two finished vials are being cooled and annealed. At just about the same time that the finishing blades come up between the vials, the supply of gas is reduced maintaining the burner still lighted and the supply of compressed air is cut off entirely so that the flame does not play upon the vials during the smoothing, finishing or truing of their bottoms against the blades.

In case it is desired to have this machine produce vials of greater diameter, and ordinarily such vials will also be of greater length, it is necessary to adjust some of the parts of the machine under these circumstances. It is not ordinarily necessary to separate the two parts of such a blank to any greater extent to form the bottoms than for the production of the smaller vials, but, inasmuch as a greater amount of stock is consumed in forming the bottoms, it is necessary to increase the inward travel of the heads to again bring the bottoms into the field of action of the gas flames for the reheating. The two parts of the magazine are adjustable toward and from each other which permits the magazine to be varied in width to receive the longer blanks. It is also necessary because of this increased length of the blanks, to separate the head farther from one another and this is done by changing the position of the clamp brackets 115 on the sliding rods of shaft 112. The beveled rubber rollers act as in the previous instance, but the greater inward travel of the heads referred to above is brought about by manipulation of the adjusting screw 126 which permits a greater rocking of the bell crank levers 116 and 117 to take place. As has been explained, this adjustment of the screw has the same effect as substituting a differently shaped operating cam to increase the extent of sliding of the shafts or rods 112.

It is to be understood that the invention is not limited and restricted to the exact embodiment herein described and that many changes may be made in structural details without departing from the substance of the invention.

I claim:

1. In a vial bottoming machine, the combination of a heater, an abutment, means to hold the double tubular glass blank against said abutment during the preliminary heating of an intermediate portion of the tube by said heater, and means to separate the blank after being preliminarily heated into two parts and close the bottoms of the pair of parts, substantially as described.

2. In a vial bottoming machine, the combination of a heater, an abutment, a beveled resilient roller adapted to hold a double tubular glass blank endwise against said abutment during heating of an intermediate section of the blank by said heater, means to revolve said roller, and means coacting with said roller to separate the blank after being heated into two parts to close the bottoms of the pair of parts, substantially as described.

3. In a vial bottoming machine, the combination of a heater, an abutment, a beveled resilient roller adapted to contact with and rotate a double tubular glass blank and hold the same endwise against said abutment during heating of an intermediate section of the tube by said heater, a second beveled resilient roller adapted to contact with said blank, whereby the two rollers are adapted to separate the blank after being heated into two parts, and means controlling the contact of said rollers with the blank, substantially as described.

4. In a vial bottoming machine, the combination of a heater adapted to heat an intermediate section of a tubular glass blank, a pair of oppositely-beveled resilient rollers adapted to bear on portions of the blank on opposite sides of its heated section and to separate the blank into two parts, the latter dividing at the heated section, means to rotate said rollers, and means controlling the contact of the rollers with the blank, permitting one of the rollers to bear on the same before the other, substantially as described.

5. In a vial bottoming machine, the combination of a heater, a pair of movable heads, means to move said heads, a conveyer adapted to bring double vial blanks successively into position between said heads to be acted upon by said heater, a pair of oppositely-beveled resilient rollers adapted to bear upon the parts of the blank at opposite sides of its heated section, means to actuate said rollers, a yielding former, and means to introduce said former between and withdraw it from between the divided blanks, said roller-actuating means, head-moving means and former-introducing means operating to rotate the double blanks and hold the same against one of the heads by one of the rollers during the heating, to separate the blank into two parts and permit the sealing of their adjacent bottoms by the separating action of both rollers on the heated double blank, to cause the blanks to approach one another to bring their bottoms into the field of action of the heater, to again separate the blanks, to introduce the former between the blanks for truing purposes and to cause the bottoms of the blanks or vials to bear against said former.

6. In a vial bottoming machine, the combination of a heater, a pair of movable heads, means to move said heads, a conveyer adapted to bring double vial blanks successively into position between said heads to be acted upon by said heater, a pair of oppositely-beveled resilient rollers adapted to bear upon the parts of the blank on opposite sides of its heated section, means to actuate said rollers, said roller-actuating means and head-moving means operating to rotate the double blanks and hold the same against one of the heads by one of the rollers during the heating, to separate the blank into two parts and permit the sealing of their adjacent bottoms by the separating action of both rollers on the heated double blank, and to cause the blanks to approach one another to bring their bottoms into the field of action of the heater, substantially as described.

7. In a vial bottoming machine, the combination of a heater, a pair of movable heads, means to move said heads, a conveyer adapted to bring double vial blanks successively into position between said heads to be acted upon by said heater, a pair of oppositely-beveled resilient rollers adapted to bear upon the parts of the blank on opposite sides of its heated section, and means to actuate said rollers, said roller-actuating means and head-moving means operating to rotate the double blanks and hold the same against one of the heads during the heating and to separate the blanks into two parts and permit the sealing of their adjacent bottoms by the separating action of both rollers on the heated double blank, substantially as described.

8. In a vial bottoming machine, the combination of means to heat the vial blank and close its bottom, and means to press the heated bottom against a yielding truing surface, substantially as described.

9. In a vial bottoming machine, the combination of means to rotate a vial blank, means to heat the blank and close its bottom, and means to press the heated bottom against a yielding truing surface, substantially as described.

10. In a vial bottoming machine, the combination of means to heat a vial blank intermediate its ends, means to separate the blank into two parts by drawing them apart, permitting the adjacent heated ends of the two blanks to seal to form bottoms, a yielding bottom former, means to introduce the same between the separated vial bottoms of the two parts, and means to apply the two bottoms to said former to true the same, substantially as described.

11. In a vial bottoming machine, the combination of means to heat a vial blank intermediate its ends, means to separate the blank into two parts by drawing them apart, permitting the adjacent heated ends of the two blanks to seal to form bottoms, a pair of truing blades, a yielding cushion between said blades, means to introduce said blades between the separated vial bottoms of the two parts, and means to apply the two bottoms to said blades to true the same, substantially as described.

12. In a vial bottoming machine, the combination of a movable head, a cam, a connection between said cam and head, and adjusting means to modify the extent of travel of said head, substantially as described.

13. In a vial bottoming machine, the combination of a movable head, a cam having a cam groove, a connection between said cam and head including a roller adapted to travel in said groove, said groove at one or more portions being wider than said roller, and adjusting means coöperating with said cam to determine the movement of said roller, substantially as described.

EVAN E. KIMBLE.

Witnesses:
WM. D. BUGE,
D. W. GRUBEL.